US008446983B2

(12) United States Patent
Wang et al.

(10) Patent No.: US 8,446,983 B2
(45) Date of Patent: May 21, 2013

(54) AMPLITUDE SHIFT KEYED (ASK) DEMODULATION PATTERN AND USE IN RADIO FREQUENCY IDENTIFICATION (RFID)

(75) Inventors: Jiaqing Wang, Shanghai (CN); Qingyang Wu, Shanghai (CN); Yunxiang Peng, Shanghai (CN); Wenzhe Luo, Shanghai (CN)

(73) Assignees: Semiconductor Manufacturing International (Shanghai) Corporation, Shanghai (CN); Semiconductor Manufacturing International (Beijing) Corporation, Beijing (CN)

( * ) Notice: Subject to any disclaimer, the term of this patent is extended or adjusted under 35 U.S.C. 154(b) by 489 days.

(21) Appl. No.: 12/692,603

(22) Filed: Jan. 23, 2010

(65) Prior Publication Data
US 2010/0189196 A1 Jul. 29, 2010

(30) Foreign Application Priority Data

Jan. 23, 2009 (CN) .......................... 2009 1 0045893

(51) Int. Cl.
*H03D 1/24* (2006.01)
(52) U.S. Cl.
USPC ........... 375/320; 375/316; 329/348; 329/350; 329/365; 329/370; 455/337

(58) Field of Classification Search
USPC ................. 375/320, 316; 329/348, 350, 365, 329/370; 455/337
See application file for complete search history.

(56) References Cited

U.S. PATENT DOCUMENTS

| 6,255,901 | B1 * | 7/2001 | Steinhagen et al. | 329/348 |
| 2006/0103457 | A1 * | 5/2006 | Kumar et al. | 329/347 |
| 2006/0227845 | A1 * | 10/2006 | Degertekin et al. | 372/102 |
| 2008/0252367 | A1 * | 10/2008 | Pettersen et al. | 329/311 |

FOREIGN PATENT DOCUMENTS

CN 101309069 A 11/2008

* cited by examiner

*Primary Examiner* — Zewdu Kassa
(74) *Attorney, Agent, or Firm* — Kilpatrick Townsend & Stockton LLP

(57) ABSTRACT

A demodulation circuit for an Amplitude Shift Keyed (ASK) modulated signal includes an envelope detector, an alternating voltage amplifier, a differentiator circuit, and a comparator having a hysteresis connected in series. The envelope detector produces an envelope signal from the received ASK signal. The amplifier blocks the DC component of the envelope signal and amplifies AC components of the envelope signal to obtain a steeper slope of the rising and falling edges. The differentiator circuit then processes the transition edges to provide a differentiated signal having positive and negative electrical pulses. The comparator converts the pulses into a binary data stream which corresponds to the transmitted data stream. The combination of the differentiated signal and comparator having a hysteresis enables better stability and sensitivity of the ASK demodulation circuit.

18 Claims, 4 Drawing Sheets

AMPLITUDE SHIFT KEYED (ASK) DEMODULATION PATTERN AND USE IN RADIO FREQUENCY IDENTIFICATION (RFID)

CROSS-REFERENCE TO RELATED APPLICATION

This application claims priority to Chinese Patent Application No. 200910045893.0 filed Jan. 23, 2009 in the of the People's Republic of China, commonly assigned herewith and incorporated by reference herein for all purposes.

BACKGROUND OF THE INVENTION

The convenience and flexibility offered by radio frequency identification (RFID) techniques have caused this technology to become popular in recent years. Specifically, RFID technology facilitates contactless communication of personal and commercial information. For example, use of an RFID tag in a retail or logistical context allows a customer to select a basket of goods and bring those goods to a supermarket exit, without having to engage in time consuming bar code scanning: The RFID tag on the product allows the information list of the goods to appear on a screen, and then the customer can provide payment for those goods. With use of an RF interrogator, an RFID tag, an antenna, and a manage block, such an RFID system transforms the formerly cumbersome and lengthy payment procedure an easy and quick one. Moreover, RFID technology allows a merchant to automatically update product inventories in real time. Numerous other possible applications exist for RFID technology apart from the retail environment just described.

One key step in the application of RFID technology is the demodulation of a signal received as a result of RF interrogation of the RFID tag. Typical digital data modulation procedures between interrogator and transponder in RFID systems include amplitude shift keying (ASK), frequency shift keying (FSK), and phase shift PSK (phase shift keying), with ASK being most commonly used.

A couple of approaches have conventionally been used to demodulate an ASK signal. In coherent detection, a local coherent reference is multiplied with the received signal. A filter is then used to obtain the approximate envelope of the signal. The original signal can then be recovered utilizing a sample-and-hold circuit with a threshold device.

Noncoherent detection is a second approach conventionally employed to demodulate an ASK signal. In noncoherent detection, the signal envelope is first extracted, and then a sample-and-hold circuit plus a threshold device are used to recover the original signal.

Demodulation of ASK signals by coherent detection offers excellent performance, but requires relatively complex and expensive structures for the implementation. By contrast, demodulation of ASK signals by noncoherent detection requires simpler and cheaper structures. This approach, however, offers good performance only where the incoming received signal exhibits a large signal to noise ratio. Despite this limitation, because cost considerations typically predominate in the mass production of consumable electronic products, noncoherent detection has thus far been the preferred approach for ASK demodulation.

From the above, it is seen that an improved technique for demodulating ASK signals is desired.

BRIEF SUMMARY OF THE INVENTION

In some embodiments of the present invention, demodulation of an Amplitude Shift Keying (ASK) modulated signal may include an envelope detector, an alternating amplifier, a differentiator circuit, and a Schmitt trigger connected in series. The envelope detector produces an envelope of the received ASK modulated signal. The amplifier blocks the DC component of the envelope of the ASK modulated signal from the detector, and processes AC components of the envelope by amplifying it to a voltage level close to the power supply so that the rising and falling edges of the amplified envelope have a higher rate of change. The differentiator circuit then differentiates the rising and falling edges of the magnified AC components to produce positive and negative pulses that have peak-to-peak voltage levels nearly twice the magnitude of the envelope. The differentiator circuit exhibits a reduced sensitivity to noise as well as a more stabilized bias level. The Schmitt trigger has a high and a low voltage triggering thresholds, forming a voltage hysteresis. The Schmitt-trigger switches from a logical low to a logical high when it receives a positive pulse and switches from a logical high to a logical low when it receives a negative pulse at its input. The triggering levels or the voltage hysteresis can be selected to assure a stable demodulation.

An embodiment of a method in accordance with the present invention for demodulating an ASK modulated signal includes receiving an ASK modulated signal and identifying an envelope signal of the modulated signal. In some embodiments, the envelope signal has at least a first amplitude and a second amplitude. In some embodiments, the envelop signal includes at least a rising edge and a falling edge. The method further includes processing the envelope signal to extract an AC signal and differentiating the AC signal to produce one or more negative and/or one or more positive pulses. The method further includes processing the one or more negative and/or one or more positive pulses to obtain a data content.

An embodiment of an ASK demodulation circuit in accordance with the present invention includes an envelope detector having an input terminal for receiving an ASK modulated signal and an output terminal generating an envelope signal. A differentiator circuit coupled to the envelope detector is configured to differentiate an AC signal from the envelope signal to produce one or more positive and negative differentiated signals. A comparator with hysteresis includes an input terminal coupled to the differentiator circuit is configured to receive the one or more positive and negative differentiated signals and an output terminal providing a digital output signal.

An embodiment of a method in accordance with the present invention includes receiving an ASK signal and producing an envelope signal from the received ASK signal. The method further includes blocking a DC component of the envelope signal and increasing the rates of change of the rising or falling edges of the DC-blocked envelope signal. The method further includes differentiating the rising and falling edges to produce output pulses, and comparing the output pulses to obtain a digital data signal.

BRIEF DESCRIPTION OF THE DRAWINGS

The features and advantages of the present invention may be better understood with reference to the detailed description and accompanying figures, in which.

DETAILED DESCRIPTION OF THE INVENTION

Figure 1A:
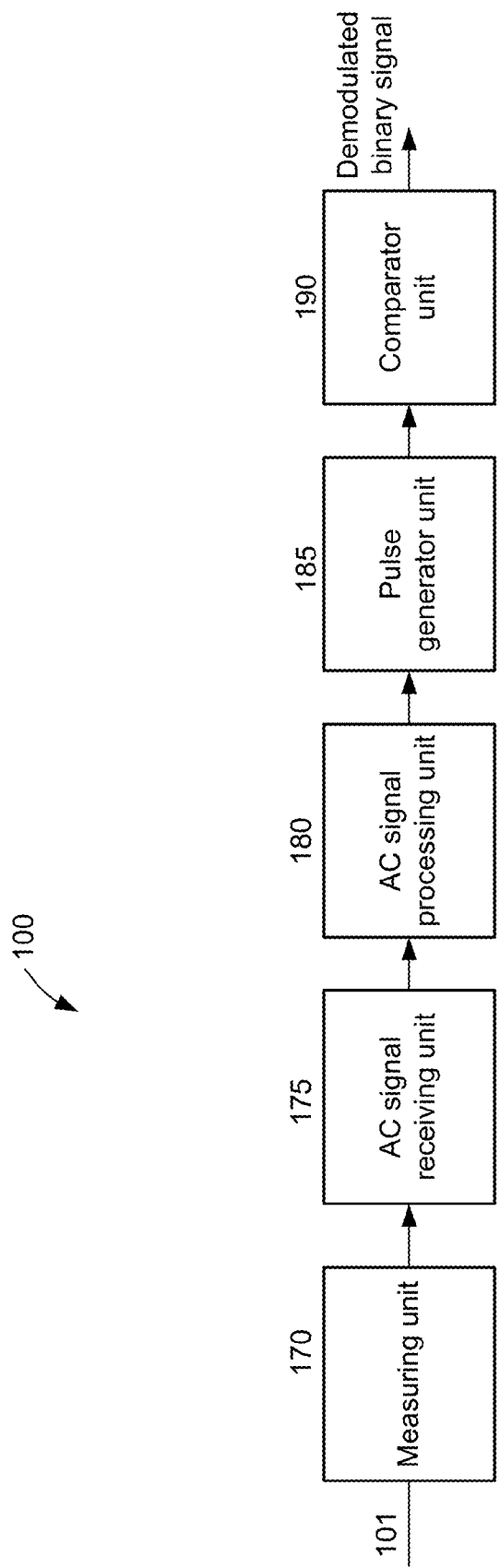
FIG. 1A is a simplified block diagram of an ASK demodulation apparatus in accordance with an embodiment of the present invention.

Embodiments in accordance with the present invention relate to a demodulator for amplitude shift keyed (ASK) signals. More particularly, in some embodiments, the disclosed demodulator can be used in an RFID transponder receiving an ASK signal from the interrogator (reader). However, it would be recognized that the invention has a much broader range of applicability, and can be used in applications requiring ASK demodulation.

Embodiments in accordance with the present invention are based on a non-coherent detection scheme for demodulation of ASK signals. Specifically, once the envelope signal of a received ASK signal has been extracted, an AC coupling is used to block the DC component of the signal. The DC-blocked envelope signal is indicative of a digital data content, e.g., the digital data information embedded in an RFID tag. In an embodiment, the envelope signal is verified in its shape and its magnitude value. In another embodiment, an amplifier may be used to increase the amplitude of the envelope signal, and more significantly to increase the slope (absolute value) or rates of change of rising and falling edges of the envelope signal. A differentiator coupled to the amplifier is configured to differentiate the steep-sloped edges of the envelope signal and generates positive and negative output pulses. A comparator with a high threshold level and a low threshold level includes an input terminal configured to receive the output pulses of the differentiator and an output terminal configured to provide a digital output signal that corresponds to the digital data content. In an embodiment, the comparator is a Schmitt trigger having a hysteresis.

In accordance with specific embodiments of the present invention, an Amplitude Shift Keyed (ASK) modulated signal may be demodulated utilizing an alternating voltage amplifier, a differentiator circuit, and a comparator with a hysteresis connected in series. An envelope signal of the ASK modulated signal is first extracted from an envelope detector. The voltage amplifier blocks the DC component of the envelope signal of the ASK modulated signal from the detector, and amplifies AC components of the envelope signal to a voltage level close to the power supply, i.e., peak-to-peak voltage level. Thus, the amplified envelope signal exhibits steeper slopes (absolute values) of the rising and falling edges. The rising and falling edges with steeper slopes are then differentiated by the differentiator circuit to produce respective positive and negative pulses, where the peak-to-peak voltage is about twice the magnitude of the amplified envelope signal. The differentiator circuit is less sensitive to noise and it only operates at the steeper slope of the rising and falling edges of the envelope signal. The comparator then compares the pulses with a high level threshold and a low level threshold and produces a digital data output. In an embodiment, the comparator may be a Schmitt-trigger having an optimal hysteresis to provide stability for the demodulator.

Figure 1B:
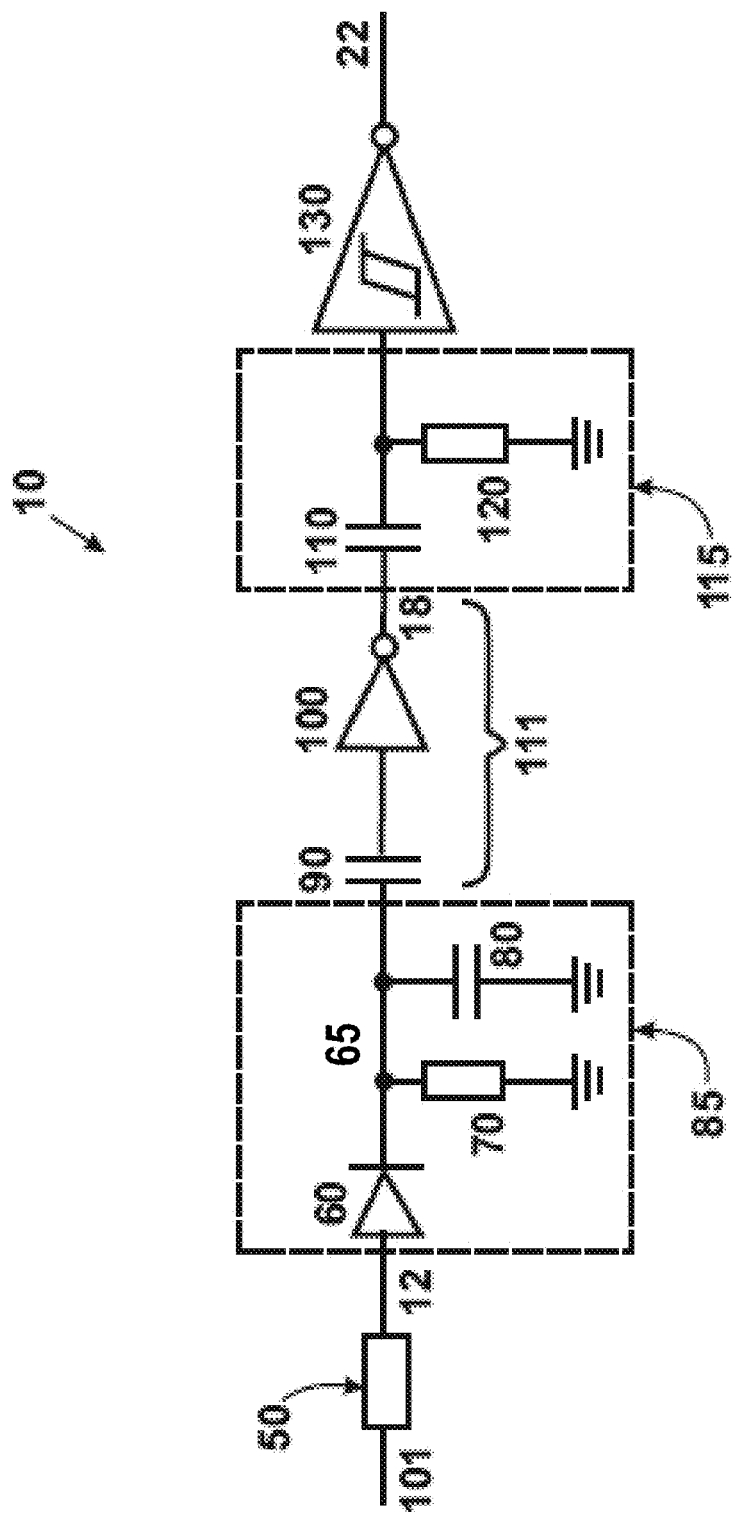
FIG. 1B is a simplified schematic diagram of an ASK demodulation circuit in accordance with an embodiment of the present invention.

FIG. 1A is a simplified block diagram of an ASK demodulator device 100 according to an embodiment of the present invention. ASK demodulator device 100 includes a measuring unit 170 configured to measuring the magnitude of a received ASK modulated signal 101 and an AC signal receiving unit 175. Measuring unit 170 may include a level limiter that limits the magnitude of the received ASK modulated signal or an amplifier that amplifies the ASK signal to an adequate output level that can be further processed in the subsequent AC signal processing unit 175. AC signal receiving unit 175 can be an edge detector or an envelope detector that provides an envelope signal representative of the data content of the transmitted signal. Demodulator device 100 further includes an AC signal processing unit 330 configured to increase the edges of the received AC signal and a pulse generator unit 185 configured to generate pulses from the edges of the received AC signal. In addition, modulator device 100 includes a comparator unit that converts the pulses into a binary data stream corresponding to the original transmitted binary data stream. Explain the ASK signal incl. RF carrier, modulating the data content. Amplitude limiter to limit the signal level, FIG. 1B is a simplified schematic diagram of an embodiment of an ASK demodulation circuit in accordance with some embodiments of the present invention. ASK demodulation system 10 includes resistor 50 and envelope detector 85 comprising diode 60, resistor 70, and capacitor 80. Demodulation system 10 further comprises a coupling capacitor 90, an amplifier 100, and a differentiator 115 comprising a capacitor 110 and a resistor 120. ASK demodulation system 10 further comprises Schmitt trigger 130, which in particular embodiments could be replaced by a comparator or inverter, depending upon the particular application.

FIG. 1B depicts merely one example of an ASK demodulator circuit 10 in accordance with an embodiment of the present invention, and should not be interpreted to unduly limit the scope of the claims. One of ordinary skill in the art would recognize many variations, alternatives, and modifications.

In an embodiment of the present invention, demodulator circuit 10 includes an envelope detector 85 and a differentiator 115 that is coupled to a comparator 130. In another embodiment, demodulator circuit 10 may further includes an alternating voltage amplifier 111 that is interposed between envelope detector 85 and differentiator 115. Enveloper detector 85 includes an input terminal 12 coupled with an incoming ASK signal 101 through a resistor 50. In some embodiments, ASK signal 101 may be simultaneously present at more than one demodulator, i.e., input terminal 12 may connect with other sub-systems such as other identical or different demodulators in parallel (not shown). The value of resistor 50 may be determined by the required load isolation between input terminal 12 and ASK signal 101. The value of resistor 50 may also be determined by the insertion loss. In some embodiments, the value of resistor 50 can be zero, i.e., resistor 50 can be omitted. And in other embodiments, the value of resistor 50 may be a trade-off between the required load isolation and acceptable insertion loss.

Envelope detector 85 includes a diode 60 having an anode coupled to input terminal 12 and a cathode coupled to a shunt resistor 70 and a capacitor 80. Diode 60 rectifies the RF carrier to provide a rectified signal profile of the digital data content at node 65. The rectified signal profile may contain residual RF carrier ripples. Shunt resistor 70 and capacitor 80 form a lowpass filter having a cutoff frequency sufficiently below the RF carrier in order to filter out the RF carrier. The cutoff frequency is determined by the RC time constant of resistor 70 and capacitor 80 and should be chosen to be sufficiently low to filter out residual carrier ripples, and sufficiently high in order not to substantially distort the shape of the rectified signal profile, which is called the envelope signal. Since the envelope signal is a representation of the data content at the ASK modulator, the envelope signal is representative of the digital content and thus includes a high voltage level and a low voltage level. If the envelope signal is sufficiently large and the low voltage level is close to a device ground level, then the envelope signal at node 65 can be connected directly to differentiator 115, i.e., alternating voltage amplifier 111 can be omitted.

In the event that the low voltage level is high, alternating voltage amplifier 111 only includes a capacitor 90 interposed between envelope detector 85 and differentiator 115 to block the DC component of the envelope signal. In the event that the low voltage level of the envelope signal is high and the difference between the high and low voltage levels is small, alternating voltage amplifier 111 may include a voltage amplifier 100 interposed between capacitor 90 and differentiator to amplify the envelope signal and specifically increase the rates of change of the rising and falling edges of the envelope signal. The gain of amplifier 111 may be controlled to provide an adequate level of the amplified envelope signal to subsequent differentiator 115. In one embodiment of the present invention, the gain of the amplifier is about 1.5 to 2.

Differentiator 115 includes an input terminal 18 coupled to a terminal of a capacitor 110. Capacitor 110 includes a second terminal coupled to a resistor 120. Differentiator 115 converts steeper slopes of the rising and falling edges of the amplified envelope signal into respective positive and negative pulses, and maintains a stable base line level, which is insensitive to level fluctuations caused by different patterns of the digital data content.

Comparator 130 compares the positive and negative pulses against a high threshold level and a low threshold level and outputs a logic high if the pulses are higher than the high threshold level and a logic low if the pulses are lower than the low threshold level. By selecting the appropriate high and low threshold levels and the biasing level of comparator 130, the pulses will be converted back to the original data content prior to the ASK modulation.

It is noted that the demodulation circuit shown in FIG. 1B represents only one exemplary embodiment of the present invention, and different variations are possible. For example, in accordance with alternative embodiments, the input resistor may be omitted. In such alternative embodiments, there is either no sub-systems or other ASK demodulators coupled in parallel with input 12 of demodulation circuit 10 or demodulation circuit 10 itself has a large input impedance that it will not affect the connected sub-systems and demodulators.

In accordance with other alternative embodiments, resistor 70 of envelope detector 85 may be replaced by another device types. For example, a diode-connected MOSFET (PMOS or NMOS), a cascade MOSFET, or a resistive element constructed from active devices may be used.

In accordance with other alternative embodiments, resistive element 120 of differentiator 115 may be omitted entirely. In such alternative embodiments, differentiator 115 can utilize the resistive part of the input of comparator 130 as its resistive element. In such a demodulation circuit, differentiator 115 utilizes a quiescent voltage setting circuit input resistance of comparator 130.

In accordance with further alternative embodiments, where the size of the incoming signal is sufficiently large (e.g., the peak-to-peak value is close to the power supply voltage), amplifier 111 may be omitted without any mis-triggering in subsequent units.

In accordance with still other alternative embodiments, comparator 130 with a hysteresis can be a digital inverter in the event demodulation circuit 10 operates in a less noisy environment, differentiator 115 output exhibits small ripples, and the triggering is not disturbed by noise.

Figure 2:
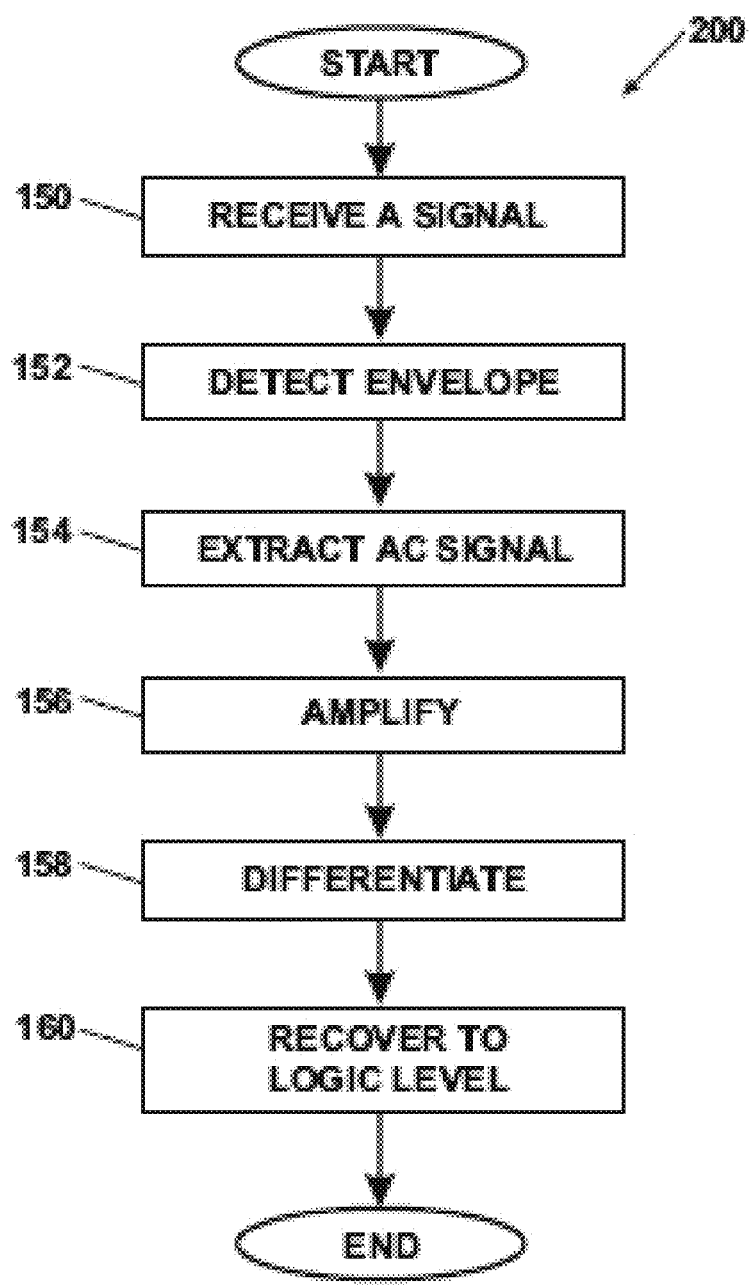
FIG. 2 is a flow chart showing a process flow of a demodulation method in accordance with an embodiment of the present invention.

FIG. 2 is a flow chart 200 showing the steps 200 of an embodiment of the method of the present invention. This flow chart is merely an instance, which should not unduly limit the scope of the claims. One of ordinary skill in the art would recognize many variations, alternatives, and modifications.

At step 150, the ASK demodulator receives an ASK modulated signal. At step 152, the demodulator detects the envelope of the ASK signal and extracts the AC signal of the envelope at step 154. At step 156, the AC signal is amplified. As described in sections above, step 156 may be omitted (i.e., amplifier 100 is not required) in the even that the AC signal has a sufficiently large voltage level. The AC signal is then differentiated at step 158 to obtain electrical pulses, which are then compared against one or two threshold levels to generate a data signal that corresponds to the original ASK modulated at step 160. In some embodiments of the invention, the differentiated AC signal (i.e., the electrical pulses) at stage 160 is compared with one threshold level if the environment is not noisy. In this case, the comparator can be a simple comparator or a digital inverter. In other embodiments where the environment is noisy, the differentiated AC signal may be compared with a high threshold level and a low threshold level; and the comparator may be a Schmitt-trigger having a hysteresis.

Figure 3:
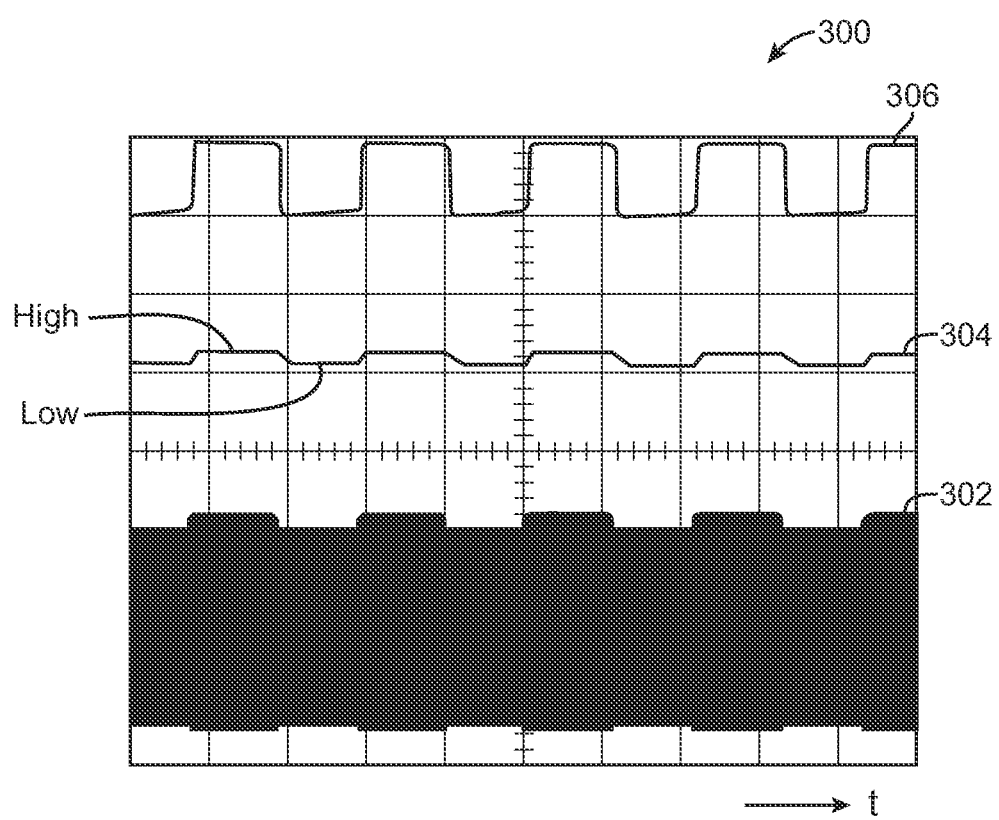
FIG. 3 shows signal profiles of certain waveforms of an exemplary demodulation circuit in accordance with an embodiment of the present invention.

Four 13.56 MHz RFID chips (or ICs) have been produced using the demodulation techniques described above. FIG. 3 provides signal profiles of various waveforms illustrating the operation of the exemplary ASK demodulator circuit. Waveform 302 (bottom) is the ASK modulated RF signal received from an RFID transponder. Waveform 302 is indicative of a digital data content that is modulated over an RF carrier (shown as a dark area). Waveform 304 (middle) is the detected envelope signal of the ASK modulated signal. The envelope signal corresponds to the signal at node 65 in FIG. 1B and includes a high level and a low level. Waveform 306 (top) is the demodulated output signal at the output of comparator 130. The demodulated output signal corresponds to the data content before the ASK modulation and has a logic level corresponding to the power supply (VDD and GND). FIG. 3 shows that the demodulation circuit can decode an ASK input signal with a modulation index as low as 5% comparing with conventional demodulators that operate with a modulation index between 8% to 14% as required.

FIG. 3 also illustrates that the output of demodulation circuit 10 is not a perfect square wave as expected, but has rather finite slopes in the rising and falling edges due to charging and discharging of a capacitive load. This is because the output of the demodulator 10 has a 0.5 pF shunt capacitor for filtering ripples. Accordingly, in order to obtain a sharper square output waveform, the shunt capacitance should be reduced or a shaping stage could be added.

Embodiments in accordance with the present invention are not limited to the specific method 200 shown in FIG. 2. Obviously, many modifications and variations of the present invention are possible in light to the above teachings. For example, method 200 can be modified by sequentially using selected/combined groups of the stages, or adding, replacing and modifying one or more stages. For instance, in accordance with one alternative embodiment, the recovering of the data content can be achieved using a comparator having a high threshold level and a low threshold level, a Schmitt Trigger having a hysteresis, or with an inverter in the event that small ripples are present in the differentiated signal.

Certain benefits over conventional approaches can be achieved by embodiments in accordance with the present invention. For example, embodiments of the present invention provide a simple circuit that not only provides better performance and lower power consumption, but also reduces area and lower manufacturing cost. Other benefits are better stability and sensitivity of the demodulator by using differentiated signals and hysteresis.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for demodulating an amplitude shift keyed (ASK) modulated signal, the method comprising:
   receiving an ASK modulated signal;
   detecting an envelope signal using an envelope detector from the modulated signal, the envelope signal including at least a rising edge and a falling edge;
   extracting an AC signal from the envelope;
   amplifying the AC signal using a voltage amplifier;
   differentiating the AC signal to generate at least a positive pulse and a negative pulse using a differentiator, where the voltage amplifier is interposed between the envelope detector and the differentiator; and converting the positive and negative pulses to obtain a data signal.

2. The method of claim 1, wherein the ASK modulated signal is received through an RFID tag.

3. The method of claim 1, wherein the envelope signal is detected through rectification of the received ASK modulated signal.

4. The method of claim 1, wherein the extracting of the envelope signal includes increasing a rate of change of the rising and falling edges.

5. The method of claim 1, wherein the converting of the positive and negative pulses comprises comparing the pulses with a voltage reference.

6. The method of claim 1, wherein the converting of the positive and negative pulses comprises comparing the positive pulse with a high voltage threshold and comparing the negative pulse with a negative voltage threshold.

7. An amplitude shift keyed (ASK) demodulation circuit for demodulating an ASK modulated signal, the circuit comprising:
   an envelope detector having an input terminal configured to receive the ASK signal and an output terminal configured to output an envelope signal, the envelope signal including at least a rising edge and a falling edge;
   a differentiator having an input terminal configured to receive the envelope signal and an output terminal configured to generate a differentiated signal, the differentiated signal having at least a positive pulse and a negative pulse;
   a voltage amplifier interposed between the envelope detector and the differentiator; and
   a comparator having an input terminal configured to receive the differentiated signal and convert the differentiated signal into a data signal.

8. The demodulation circuit of claim 6, wherein the envelope detector comprises:
   a resistive element;
   a capacitive element; and
   a rectifying element having an anode coupled to the received ASK signal and a cathode coupled to a terminal of the resistive element and a terminal of the capacitive element;
   wherein the resistive and capacitive elements are connected in parallel.

9. The demodulation circuit of claim 8, wherein the differentiator further comprises a second capacitive element having a first terminal coupled to the cathode of the rectifying element and a second terminal coupled to the comparator unit.

10. The demodulation circuit of claim 6, wherein the comparator is selected from the group consisting of a level comparator having a voltage reference, a digital logic inverter, and a comparator having a hysteresis.

11. The demodulation circuit of claim 9, wherein the differentiator further comprises a second resistive element having a first terminal coupled to the second terminal of the second capacitive element and a second terminal coupled to a circuit ground potential.

12. The demodulation circuit of claim 8, wherein the voltage amplifier comprises a third capacitive element having a third terminal coupled to the cathode of the rectifying element.

13. The demodulation circuit of claim 12, wherein the voltage amplifier further comprises an amplifier having an input terminal coupled to a fourth terminal of the third capacitive element and an output terminal coupled to the input terminal of the differentiator.

14. The demodulation circuit of claim 6, wherein the differentiator further comprises a resistive element having a first terminal coupled to the input terminal of the comparator and a second terminal coupled to a circuit ground potential.

15. The demodulation circuit of claim 6, wherein the differentiator maintains a stable base line level of the comparator.

16. The demodulation circuit of claim 6, further comprising a resistor having a first terminal receiving the ASK signal and a second terminal coupled to the input terminal of the envelope detector.

17. A method for demodulating an ASK modulated signal comprising:
   extracting a first signal from the ASK modulated signal using an envelope detector;
   blocking a DC component of the first signal to generate a second signal, the second signal having at least a rising edge and a falling edge;
   amplifying the second signal using a voltage amplifier to increase a rate of change of the rising and falling edges;
   providing the second signal to a differentiator to generate positive and negative output pulses, wherein the voltage amplifier is interposed between the envelope detector and the differentiator; and
   converting the output pulses to a data signal.

18. The method of claim 16, further comprising interrogating an RFID tag to generate the ASK modulated signal.

* * * * *